(12) United States Patent
Karlsson et al.

(10) Patent No.: US 9,532,327 B2
(45) Date of Patent: Dec. 27, 2016

(54) NODE AND METHOD FOR RAN CONGESTION STATUS HANDLING

(71) Applicant: Telefonaktiebolaget L M Ericsson (publ), Stockholm (SE)

(72) Inventors: Josefin Karlsson, Torslanda (SE); Hans Mattsson, Bollebygd (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 105 days.

(21) Appl. No.: 14/301,785

(22) Filed: Jun. 11, 2014

(65) Prior Publication Data

US 2014/0369206 A1    Dec. 18, 2014

Related U.S. Application Data

(63) Continuation of application No. PCT/EP2014/062004, filed on Jun. 10, 2014.

(60) Provisional application No. 61/834,242, filed on Jun. 12, 2013.

(51) Int. Cl.
*H04W 60/00* (2009.01)
*H04W 28/02* (2009.01)
*H04W 8/06* (2009.01)

(52) U.S. Cl.
CPC ............ *H04W 60/00* (2013.01); *H04W 8/06* (2013.01); *H04W 28/0231* (2013.01)

(58) Field of Classification Search
CPC ..... H04W 28/0231; H04W 60/00; H04W 8/06
See application file for complete search history.

(56) References Cited

U.S. PATENT DOCUMENTS

| 2010/0048209 | A1* | 2/2010 | Aoyama | H04W 24/10 455/435.2 |
| 2011/0032819 | A1 | 2/2011 | Schliwa-Bertling et al. | |
| 2011/0045832 | A1* | 2/2011 | Yang | H04W 36/0066 455/436 |
| 2011/0158090 | A1 | 6/2011 | Riley et al. | |
| 2011/0235528 | A1 | 9/2011 | Racz et al. | |
| 2012/0170503 | A1* | 7/2012 | Kelley | H04W 48/06 370/312 |

FOREIGN PATENT DOCUMENTS

EP    1670273 A1    6/2006

OTHER PUBLICATIONS

China Telecom et al. "RPPF based Solution for Operator Controlled Off-path Congestion Awareness and Notification," S2-131610 (revision of S2-131260), SA WG2 Meeting #S2-97, May 27-31, 2013, Busan, South Korea, May 21, 2013, 9 pages, XP050708820.
International Search Report and Written Opinion issued in corresponding International Application No. PCT/EP2014/062004 on Jul. 25, 2014, 12 pages.

* cited by examiner

*Primary Examiner* — Jianye Wu
(74) *Attorney, Agent, or Firm* — Rothwell, Figg, Ernst & Manbeck, P.C.

(57) ABSTRACT

Example embodiments presented herein are directed towards a mobility management node and a communications node, and corresponding methods therein, for the handling of a RAN congestion status. The example embodiments presented herein allow for a means of providing an accurate RAN congestion status in an efficient manner.

20 Claims, 11 Drawing Sheets

```
┌─────────────────────────────────────────────────────────────────────────┐
│                            ╱— 22                                         │
│  Send, to a mobility management node, a communication regarding a        │
│  wireless device servered by a RAN node, the communication being used    │
│  for RAN congestion status handling.                                     │
│                                                                          │
│   ┌─────────────────────────┐    ┌─────────────────────────────────┐    │
│   │ Communication is a      │    │ Communication is a service      │    │
│   │ Context Response        │    │ request comprising a RAN        │    │
│   │ comprising a RAN        │    │ congestion status of a cell     │    │
│   │ congestion status of a  │    │ currently seving the wireless   │    │
│   │ cell previously seving  │    │ device.                         │    │
│   │ the wireless device.    │    └─────────────────────────────────┘    │
│   └─────────────────────────┘                                            │
│                                                                          │
│           ┌─────────────────────────────────────────────┐                │
│           │ Communication is a notification of the RAN  │                │
│           │ congestion status, the communication        │                │
│           │ comprising a RAN congestion status of a     │                │
│           │ cell currently seving the wireless device.  │                │
│           └─────────────────────────────────────────────┘                │
└─────────────────────────────────────────────────────────────────────────┘
```

FIGURE 11

NODE AND METHOD FOR RAN CONGESTION STATUS HANDLING

CROSS-REFERENCE TO RELATED APPLICATIONS

This application claims the benefit of U.S. provisional patent application No. 61/834,242, filed on Jun. 12, 2013; this application is a continuation of international patent application no. PCT/EP2014/062004, filed on Jun. 10, 2014. The above identified applications are incorporated by reference herein.

TECHNICAL FIELD

Example embodiments presented herein are directed towards a mobility management node and a communications node, and corresponding methods therein, for Radio Access Node (RAN) congestion status handling.

BACKGROUND

In a typical cellular system, also referred to as a wireless communications network, wireless devices, also known as mobile stations and/or user equipment units communicate via a Radio Access Network (RAN) to one or more core networks. The wireless devices can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

In communications networks, RAN congestion may occur due to limitations in available radio resources and affects the forwarding of data in the user plane. In order to account for RAN congestion, a RAN congestion status may be taken into account.

SUMMARY

In the management of communications during RAN congestion, a RAN congestion status may be utilized by network nodes. The RAN congestion status is provided during Service Requests initiated by the network or a wireless device resulting from the wireless device exiting idle mode and connecting to the network. Currently, there are no means for providing a RAN congestion status during mobility procedures or for updating the RAN congestion status for a wireless device which has been connected to the network for a longer period of time.

At least one example object of some of the example embodiments presented herein is to provide RAN congestion management with use of a RAN congestion status for a variety of network situations. The example object may be achieved by providing an updated RAN congestion status for network the various network situations. In particular, during a mobility procedure of the wireless device and/or when the wireless device has been connected to the network for a predetermined period of time. At least one example advantage of the example embodiments presented herein is the ability to provide accurate RAN congestion status information.

Accordingly, some of the example embodiments are directed towards a method, in a mobility management node for RAN congestion status handling. The mobility management node may be a current or new Gn/Gp SGSN, S4-SGSN or MME. The method comprises receiving, from a communications node, a communication regarding a wireless device served by a RAN node, the communication comprises a received RAN congestion status. The communications node may be the RAN node serving the wireless device or an old Gn/Gp SGSN, S4-SGSN or MME. The method further comprises comparing the received RAN congestion status with a saved RAN congestion status, where the saved RAN congestion status is saved within the mobility management node prior to the receiving. If a congestion level of the received RAN congestion status is different than a congestion level of the saved RAN congestion status, the method further comprises forwarding, to a core network node or a RCAF, a current RAN congestion status associated with the wireless device in a cell currently serving the wireless device, where the current RAN congestion status is either the received RAN congestion status or the saved RAN congestion status.

Some of the example embodiments are directed towards a mobility management node RAN congestion handling. The mobility management node comprises a receiver configured to receive, from a communications node, a communication regarding a wireless device served by a RAN node. The communication comprises a received RAN congestion status. The mobility management node further comprises processing circuitry configured to compare the received RAN congestion status with a saved RAN congestion status, where the saved RAN congestion status is saved within the mobility management node prior to the receiving. The mobility management node further comprises a transmitter. If a congestion level of the received RAN congestion status is different than a congestion level of the saved RAN congestion status, the transmitter is configured to forward, to a core network node or a RCAF, a current RAN congestion status associated with the wireless device in a cell currently serving the wireless device, where the current RAN congestion status is either the received RAN congestion status or the saved RAN congestion status.

Some of the example embodiments are directed towards a method, in a communications node, for RAN congestion status handling. The method comprises sending, to a mobility management node, a communication regarding a wireless device served by a RAN node. The communication is utilized for RAN congestion status handling within the mobility management node during a wireless device mobility procedure and/or when the wireless device is in a connected state for a time period. If the communications node is a RAN node the mobility management node is a current or new Gn/Gp SGSN or S4-SGSN.

Some of the example embodiments are directed towards a communications node for RAN congestion status handling. The communications node comprises a transmitter configured to send, to a mobility management node, a communication regarding a wireless device served by a RAN node. The communication is utilized for RAN congestion status handling within the mobility management node during a wireless device mobility procedure and/or when the wireless device is in a connected state for a time period. If the communications node is a RAN node, the mobility management node is a current or new Gn/Gp SGSN or S4-SGSN.

DEFINITIONS

3GPP 3rd Generation Partnership Project
AF Application Function
AP Application Protocol
ARP Allocation and Retention Priority
CN Core network
CS Circuit Switched
CSG Closed Subscriber Group
DL Downlink
DRX Discontinuous Reception
ECM Evolved Packet System Connection Management
EPC Evolved Packet Core
EPS Evolved Packet System
E-UTRAN Evolved Universal Terrestrial Radio Access Network
GERAN GSM/EDGE Radio Access Network
GGSN Gateway GPRS Support Node
GPRS General Packet Radio Service
GRE Generic Routing Encapsulation
GSM Global System for Mobile communications
GTP GPRS Tunnelling Protocol
GW Gateway
HPLMN Home Public Land Mobile Network
HSS Home Subscriber Server
ID Identity/Identifier
IE Information Element
IP Internet Protocol
IP-CAN Internet Protocol Connectivity Access Network
IMEISV International Mobile Equipment Identity Software Version
IMS Internet Protocol Multimedia Subsystem
IMSI International Mobile Subscriber Identity
ISR Idle state Signalling Reduction
LR Location Registration
LSC Location Service
LTE Long-Term Evolution
NAS Non-Access Stratum
MAC Medium Access Control
ME Mobile Equipment
MM Mobility Management
MME Mobility Management Entity
MSISDN Mobile Station International Subscriber Directory Number
OMA Open Mobile Alliance
OTA Over The Air
P-TMSI Packet Temporary Mobile Subscriber Identity
PCC Policy Control and Charging
PCRF Policy Control and Charging Rules Function
PDP Packet Data Protocol
PDN Packet Data Network
PDU Protocol Data Unit
PGW PDN Gateway
PLMN Public Land Mobile Network
PS Packet Switched
QCI QoS Class Identifier
QoS Quality of Service
RAI Routing Area Identity
RAN Radio Access Network
RAT Radio Access Type
RAU Routing Area Update
RCAF RAN Congestion Awareness Function
RNC Radio Network Controller
RRC Radio Resource Control
SCI Service Class Identifier
SGSN Serving GPRS Support Node
SGW Serving Gate
SIRIG Service Identification for RRC Improvements in GERAN
TA Tracking Area
TAI Tracking Area Identity
TAU Tracking Area Update
TFT Traffic Flow Template
THP Traffic Handling Priority
TIN Temporary Identifier
TMSI Temporary Mobile Subscriber Identity
UE User equipment
UICCI Universal Integrated Circuit Car
UL Uplink
ULR Update Location Request
UMTS Universal Mobile Telecommunications System
UPCON User plane congestion
URA UTRAN Registration Area
UTRAN Universal Terrestrial Radio Access Network

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 11 is a flow diagram depicting example operations which may be taken by the communications node of FIG. 9, according to some of the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

It should be appreciated that all of the example embodiments presented herein may be applicable to a GERAN, UTRAN or E-UTRAN based system.

General Overview

Figure 1:
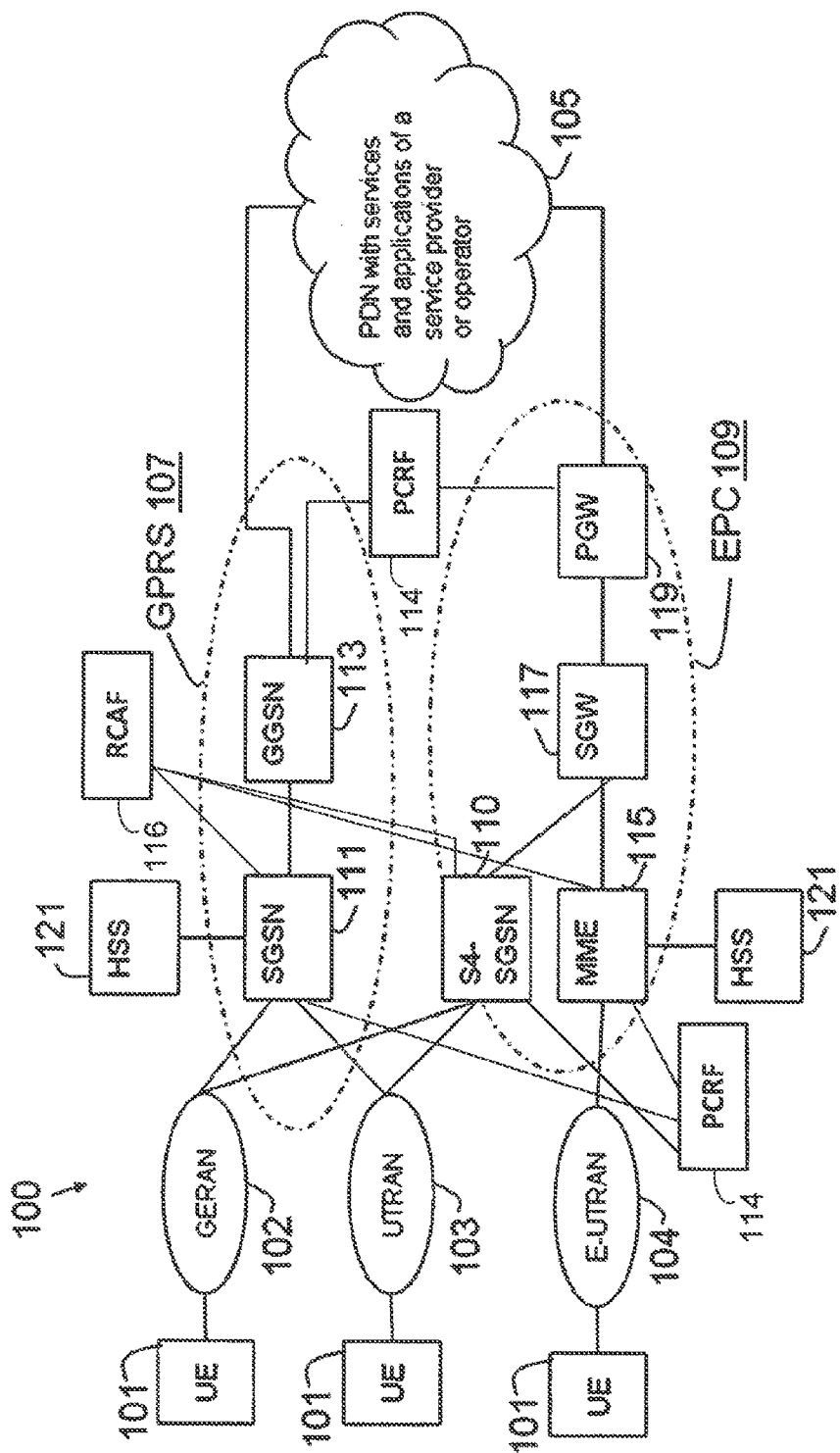
FIG. 1 is an illustrative example of a wireless network.

In order to provide a better explanation of the example embodiments presented herein, a problem will first be identified and discussed. FIG. 1 provides a general example of a communication network 100. As shown in FIG. 1, a wireless device or user equipment (UE) 101 may be in communication with a RAN node 103, 104, and 102 in a Universal Terrestrial Radio Access Network (UTRAN), an Evolved UTRAN (E-UTRAN), or a GSM Edge Radio Access Network (GERAN) subsystem, respectively, in order to gain communication to an operator or application server 105. In gaining access to SCS, AS, AF or hosts 105, the UTRAN/E-UTRAN/GERAN subsystem RAN nodes 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Gn/Gp Serving GPRS Support Node (SGSN) 111, which may be responsible for the delivery of data packets to and from the mobile stations within an associated geographical service area. The Gn/Gp SGSN 111 may also be responsible for packet routing, transfer, mobility management and connectivity management. The GPRS subsystem 107 may also include a Gateway GPRS Support Node 113, which may be responsible for the interworking between the GPRS subsystem 107 and the PDN 105.

The EPC subsystem 109 may comprise a Mobility Management Entity 115, which may be responsible for mobility management, connectivity management, idle mode UE tracking, paging procedures, attachment and activation procedures, and small data and message transfer. The EPC subsystem may also comprise a Serving Gateway (SGW) 117, which may be responsible for the routing and forwarding of data packets. The EPC subsystem may also include a Packet data network Gateway (PGW) 119, which may be responsible for providing connectivity from the user equipment 101 to one or more PDN(s) 105. Both the Gn/Gp SGSN 111 and the MME 115 may be in communication with a Home Subscriber Server (HSS) 121, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

FIG. 1 further illustrates a RCAF node 116 which is responsible for RAN congestion status handling within a wireless network and provides user plane congestion information to the PCRF. The RCAF 116 is in communication with the mobility management nodes, for example, the Gn/Gp SGSN 111, the S4-SGSN 110 and the MME 115. Further information regarding the RCAF is provided in 3GPP TR 23.705 version 11.

In communications networks, RAN congestion may occur due to limitations in available radio resources and affects the forwarding of data in the user plane. In order to account for RAN congestion, a RAN congestion status may be taken into account.

Since GPRS/UMTS R99 the mechanism for prioritizing services over the radio interface has been based on the bearer concept. Bearers carrying non-real time traffic belonging to high priority services or users are assigned a high Traffic Handling Priority (THP) or QCI that assures the traffic received superior treatment in core and radio in cases of congestion.

More advance mechanisms for handling congesting in the radio access is needed. The concept of secondary PDP-context has not yet reached the market on a wider scale for GERAN and UTRAN accesses. Also even with secondary PDP-contexts for UTRAN and dedicated bearers for EPS, there has been claimed to be limitations since the dedicated bearers are limited in their capability by the Traffic Flow Template (TFT); certain services may be hard to capture with a TFT or frequent updates of the TFT may be needed.

For 3GPP Rel-11 a solution for GERAN was specified, called SIRIG (Service Identification for RRC Improvements in GERAN: http://www.3gpp.org/ftp/Specs/html-info/FeatureOrStudyItemFile-530003.htm), that is based on the packet core doing packet inspection and then marking each DL user plane GTP-segment with a specific Service Class Identifier (SCI) for the GERAN to take further differentiation actions on. There is currently no equivalent solution for UTRAN and E-UTRAN accesses specified.

3GPP SA1 has defined a set of use case scenarios that UPCON solutions should address. Currently 3GPP SA2 are discussing solution alternatives for UPCON. In general solutions have been divided between RAN based solutions for RAN user plane congestion management, which rely on provisioning of additional information to the RAN to do the prioritization, for example, SIRIG, and CN based solutions for RAN user plane congestion management, which rely on feedback to the core network.

From an operational perspective, one advantage of CN based solutions compared to RAN based solutions could be that CN based solutions would hypothetically require less integration and coordination between the RAN and the Core Network, for example, all differentiation would be done within the Core Network domain based on some form of simple feedback from the RAN.

Overview of the Example Embodiments

If the wireless device is in a RAN congestion situation and a CN based solution for RAN user plane congestion management is used and the wireless device moves to a non-RAN congested cell in idle mode where it triggers a Service Request. For this situation there is no mechanism to change the mitigation actions started in the old cell due to RAN congestion. The wireless device will therefore never get better performance again and will not have the performance reflecting a non-congested RAN situation. However, the wireless device may have different performance due to a RAT change, but still the RAN congestion situation is expected by the CN.

For a CN based solution for RAN user plane congestion management there are some aspects which need to be considered. First, during a Routing Area Update or a Tracking Area Update procedure, the RAN congestion status from the old cell needs to be transferred from the old or source mobility management node, for example, a MME, Gn/Gp SGSN, or an S4-SGSN, to the new or target mobility management node. Second, during a Service Request when the RAN is non-congested RAN this information needs to be provided from RAN to the mobility management node, the mobility management node needs to send this information further up in the CN for some situations, for example to the SGW, PGW, GGSN, PCRF, AF and/or RCAF. Third, if the wireless device is connected for a predetermined period of time, and a change in the RAN congestion status occurs, the RAN node may provide the updated RAN congestion status to the mobility management node. Fourth, detach procedure means that the RAN congested status stored in CN shall be removed. Furthermore, RAN congestion status handling during mobility procedure in which the wireless device is in a connected state shall also be considered.

The purpose of the example embodiments described herein, is that the RAN congestion status used and stored in the CN shall be correctly updated enabling proper actions to be taken. Thus, the example embodiments presented herein are directed towards the transfer and handling of a RAN congestion status. The example embodiments are applicable for LTE, UTRAN and GERAN.

The remainder of the text is arranged as follows: First, example embodiments directed towards RAN congestion status management during a wireless device mobility procedure are discussed under the subheading 'RAN congestion status transfer during a mobility procedure'. Thereafter, example embodiments directed towards RAN congestion status management during a Service Request are provided under the subheading 'RAN congestion status transfer during a Service Request'. Additional example embodiments directed towards dynamic RAN congestion status management are provided under the subheading 'Dynamic RAN congestion status updates'. Further example embodiments for the management of the RAN congestion status during detach procedures are provided under the subheading 'RAN congestion status management during detach procedures'. Example node configurations of a mobility management node and a communications node are provided under the subheading 'Example node configurations'. Finally, example operations which may be taken by the mobility management node and the communications node are provided under the subheading 'Example node operations'.

RAN Congestion Status Transfer During a Mobility Procedure

According to some of the example embodiments, the RAN congestion status is provided during a mobility procedure. It should be appreciated that according to some of the example embodiments, the transfer of the RAN congestion status may occur while the wireless device is in idle mode. Once a RAN congestion status is provided while the wireless device is in idle mode, the mobility management node may save the status to for handling at another time, for example, upon receipt of a service request.

It should be appreciated that the example embodiments need not be limited to idle mode transfer of the RAN congestion status. According to some of the example embodiments, the RAN congestion status may be provided while the wireless device is in connected, or non-idle, mode. In such instances, the mobility procedure may be a handover, TAU or RAU. According to these example embodiments, the mobility management node may compare a received RAN congestion status, which is associated with a cell previously serving the wireless device, with a saved RAN congestion status, which is associated with a cell currently serving the wireless device (e.g., upon completion of the mobility procedure). If upon comparison, the received and saved RAN congestion statuses differ, the mobility management node may be configured to forward the saved or current RAN congestion status to other network nodes.

During a Routing Area Update or Tracking Area Update procedure, there is a context retrieval received from the old mobility management node, also known as the source node, to the new mobility management node, also known as the target node. The old RAN considers the "old cell" as RAN congested or non-RAN congested and this information has previously been sent to the old mobility management node which has stored it. According to the example embodiments, the context retrieval also comprises the RAN congested status for the old cell. This information may be per cell level reporting, per user level or per bearer level. The new mobility management node stores this information.

According to some of the example embodiments, the RAN congestion status in the context retrieval may be provided in a Routing Area Update in either the message Context Response or SGSN Context Response depending what is used for the procedure. According to some of the example embodiments, the RAN congestion status may also be provided in a Tracking Area Update in either the message Context Response or SGSN Context Response depending what is used for the procedure.

Figure 2:
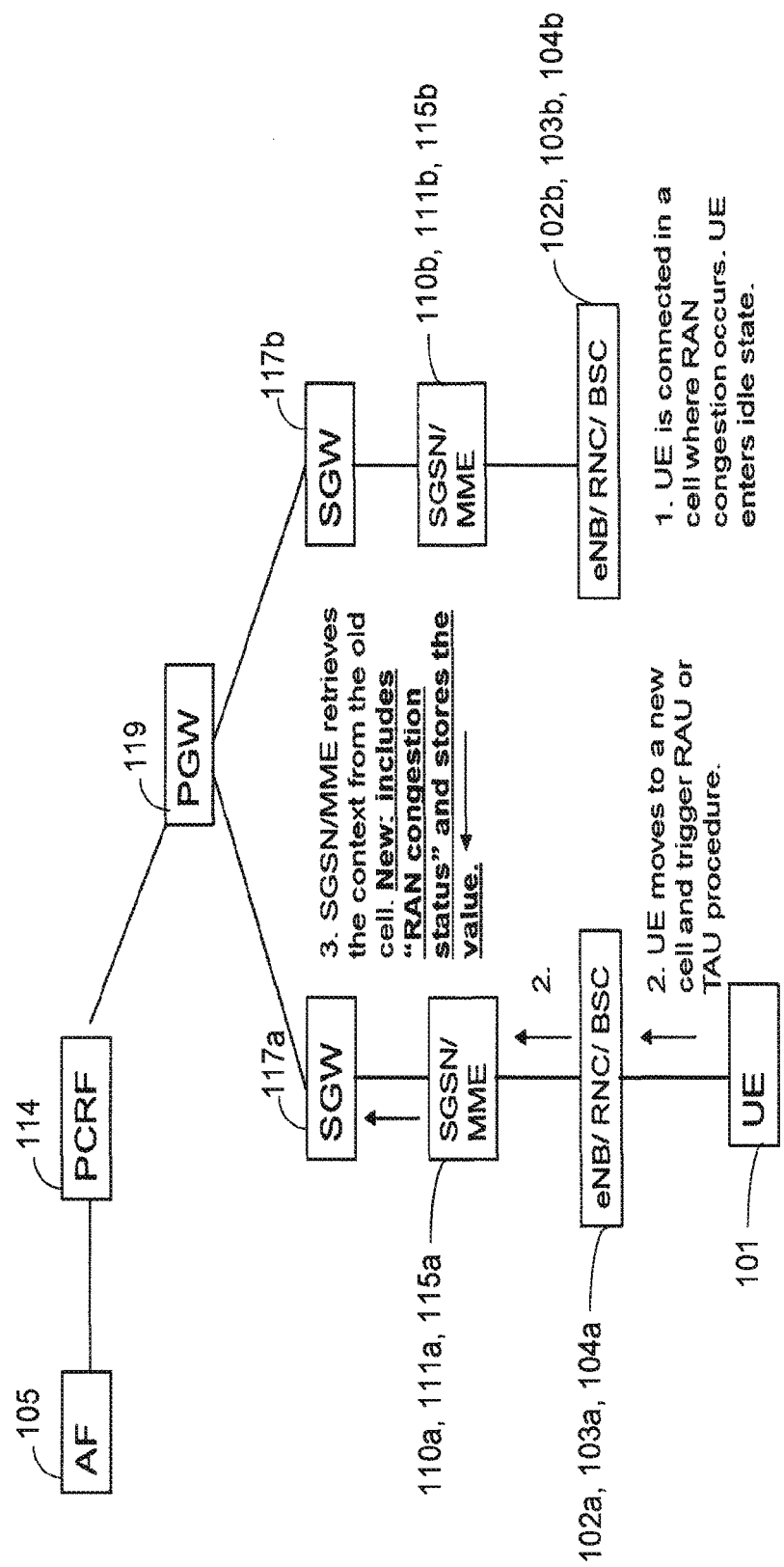
FIGS. 2 and 3 are message flow diagrams depicting RAN congestion status management during a wireless device mobility procedure, according to some of the example embodiments.

FIG. 2 illustrates a block diagram depicting a message flow for providing a RAN congestion status during a mobility procedure. Specifically, FIG. 2 illustrates the case of RAN congestion status management upon a wireless device 101 undergoing a RAU or TAU procedure. According to the example of FIG. 2, first, the wireless device (UE) 101 is connected to a cell and enters an idle state (message 1). Thereafter, the wireless device (UE) 101 moves to a new cell and then triggers a RAU or TAU (message 2). This request is forwarded to the new mobility management node, for example, a MME 115a, Gn/Gp SGSN 111a, or a S4-SGSN 110a. The new mobility management node 110a, 111a, 115a receives context information from the old mobility management node 110b, 111b, 115b (message 3). This context information comprises the RAN congestion status of the old cell. The new mobility management node 110a, 111a, 115a stores the received RAN congestion status, within the new mobility management node 110a, 111a, 115a, for future use. According to some of the example embodiments, the new mobility management node shall generate a CN notification to the RCAF. The SGW, PGW, GGSN, PCRF and optionally the AF will receive a RAN congestion status at the next Service Request, if the status has changed considering the stored RAN congestion status received from the old mobility management node 110*b*, 111*b*, 115*b*.

Figure 3:
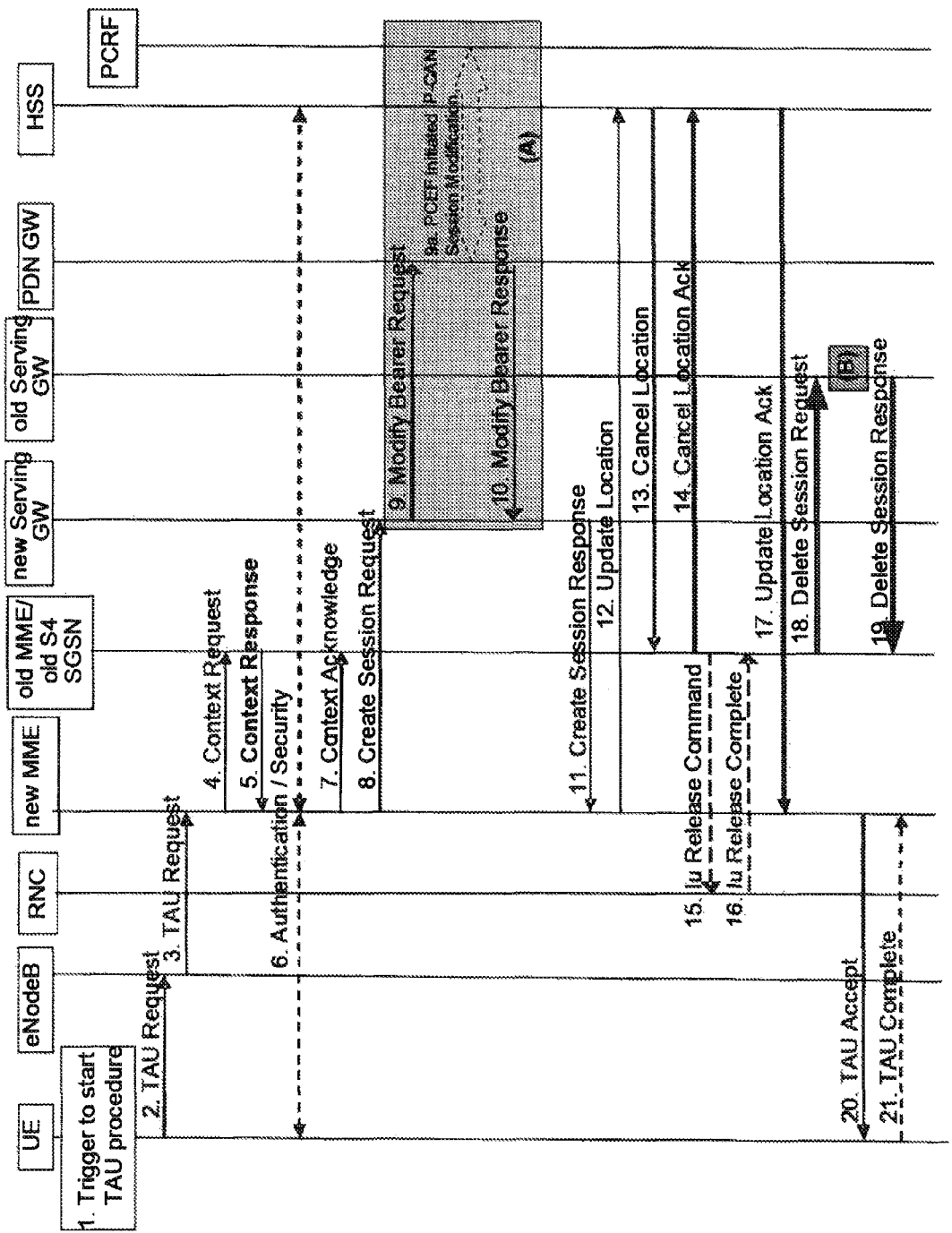

FIG. 3 illustrates a message flow diagram for an LTE Tracking Area Update procedure with a change in a SGW according to 3GPP TS 23.401 v12 clause 5.3.3.1, which is used herein to explain how the example embodiments may be applied. As shown in FIG. 3, a wireless device (UE) may initiate a TAU procedure and thereafter send a TAU request to a base station or RAN node (messages 1 and 2). The base station or RAN node will thereafter forward the request to a new or target mobility management node (message 3). The new or target mobility management node will thereafter send a Context Request message to an old or source mobility management node (message 4).

The old or source mobility management node responds with a Context Response (message 5). According to some of the example embodiments, the RAN congestion status, associated with the nodes serving the wireless device before the initiation of the TAU procedure, is provided. The information provided in the Context Response message is stored in the new mobility management node. Messages 6-21 describe the remainder of the TAU procedure as known in the art.

RAN Congestion Status Transfer During a Service Request

According to some of the example embodiments, a RAN congestion status may be provided during a Service Request. During a Service Request, for example, following a mobility procedure as described in the above section, if the RAN is non-congested, the non-congested RAN status should be stored in the new mobility management node replacing a previously notified RAN congestion from the old mobility management node. This information is either indicated directly or indirectly from the RAN. Any changes with respect to a RAN congestion status should be updated or stored within the mobility management node. Thus, according to some of the example embodiments, a received RAN congestion status, for example, received in the Service Request, may be compared to a saved RAN congestion status, or a RAN congestion status which is previously saved within the mobility management node.

If the congestion level of the received and saved RAN congestion status differ, the mobility management node may thereafter send the received RAN congestion status, which represents a current RAN congestion status associated with a cell currently serving the wireless device, to other core network nodes or a RCAF. Examples of such core network nodes are the SGW, PGW, GGSN, PCRF, the AF and/or to the RCAF or a similar function. The current RAN congestion status may also be stored in all these nodes. With this information available, further mitigation action is enabled such as change of PCC rule, bit rate change for the bearer, change of video codec, etc. If there is no RAN congestion status received from the old mobility management node, the new mobility management node shall generate a CN notification to the SGW, PGW, GGSN, PCRF and optionally to the AF and/or to the RCAF or a similar function. The generation of the CN notification may also occur the first time a Service Request is received from the wireless device in the new cell.

Figure 4:
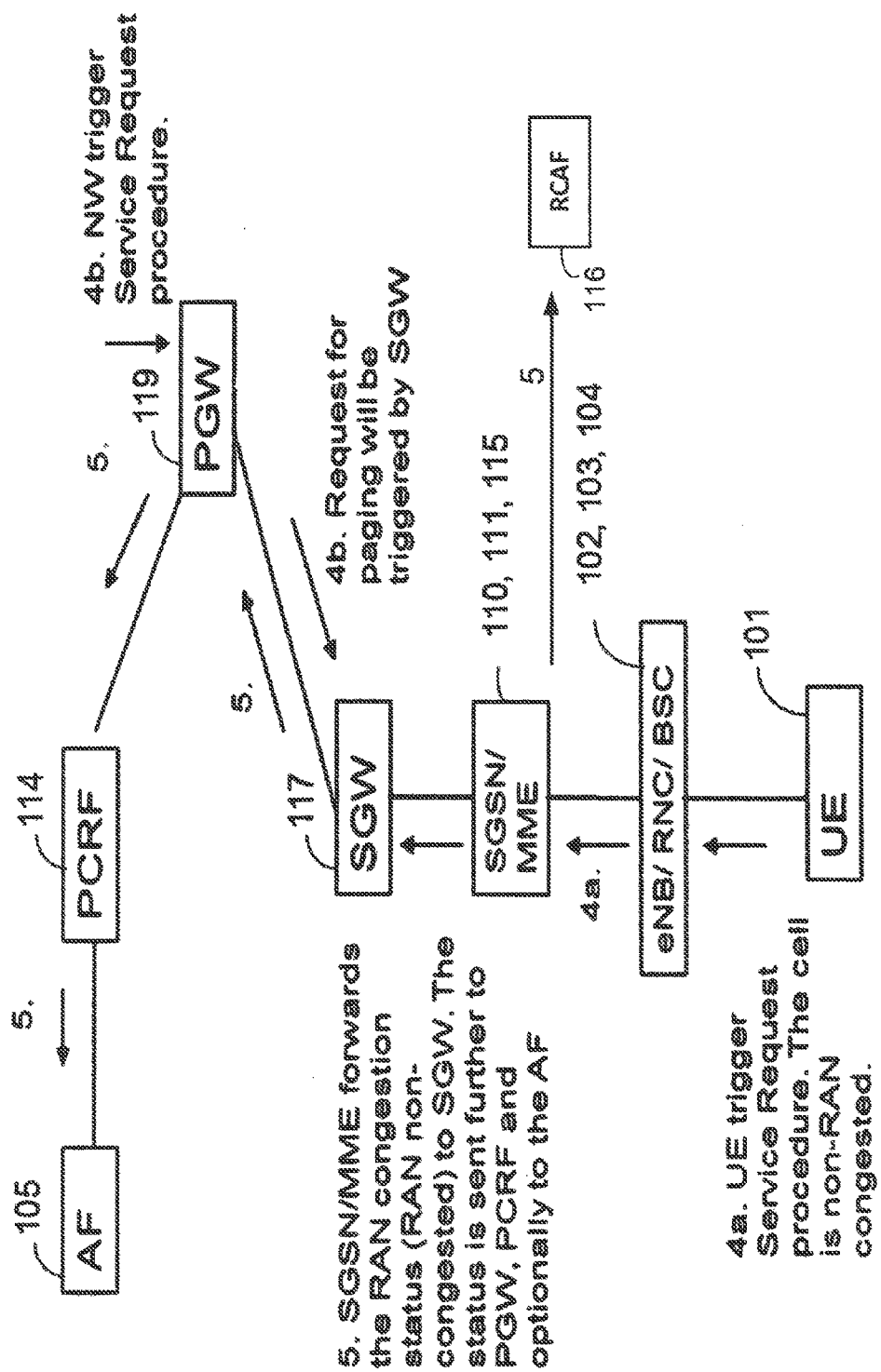
FIGS. 4 and 5 are message flow diagrams depicting RAN congestion status management during a Service Request, according to some of the example embodiments.

FIG. 4 illustrates a block diagram depicting a message flow for providing a RAN congestion status during a Service Request. As illustrated in FIG. 4, first, the wireless device (UE) 101 initiates a Service Request procedure, for example, upon leaving an idle mode (message 4a). The Service Request may be transmitted to the mobility management node, for example, a MME 115, Gn/Gp SGSN 111 or S4-SGSN 110, via the base station or RAN node 102, 103, 104. It should be appreciated that the request procedure may comprise a RAN congestion status of the RAN node serving the wireless device (UE) 101. According to some of the example embodiments, the RAN congestion status may be provided by the RAN node.

It should be appreciated that instead of a wireless device (UE) server request, the example embodiments may also be applied to a network triggered Service Request (message 4b). This may occur, for example, when there is downlink data available for an idle mode wireless device. A paging request may be sent to the mobility management node via, for example, the SGW. Upon receiving such a request, the wireless device may send a Service Request. The request procedure may comprise a RAN congestion status of the RAN node serving the wireless device.

Upon receiving communications via either message 4a or 4b, the mobility management node may compare the RAN congestion status associated with the communication request with a RAN congestion status that may be previously stored in the mobility management node, for example via the procedure depicted in FIGS. 2 and 3.

If it is determined that a current RAN congestion level, for example, associated with the received communications request, is different than the RAN congestion level of the previously stored RAN congestion status, the mobility management node may forward the current RAN congestion status to the SGW 117, PGW 119 or GGSN, PCRF 114 and optionally to the AF 105 and/or to the RCAF or a similar function (message 5). The forwarding of the RAN congestion status allows the wireless device to experience a better quality of service.

It should be appreciated that the current RAN congestion level may be forwarded if a congested state is changed from congested to non-congested for a particular user or wireless device or vice versa. Thus, the current RAN congestion level may be forwarded if the current RAN congestion level is lower or higher than the previously stored RAN congestion status.

Figure 5:
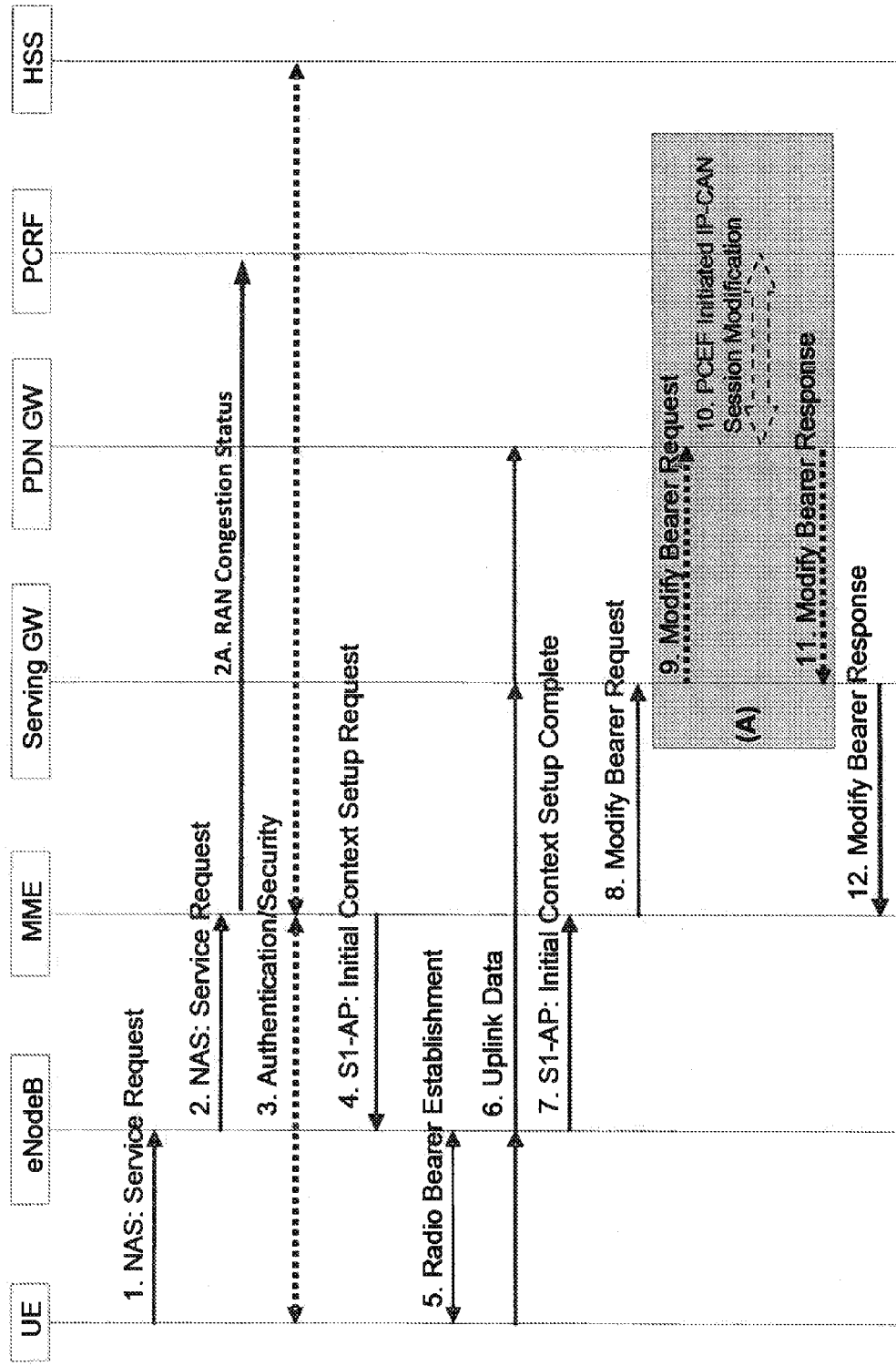

FIG. 5 illustrates an LTE wireless device (UE) triggered Service Request procedure according to 3GPP TS 23.401 v12.0.0 clause 5.3.4.1, which is used herein to explain how the example embodiments may be applied. As illustrated in FIG. 5, the wireless device (UE) may send a NAS Service Request to the base station or RAN node (message 1). The base station/RAN node will forward the NAS Service Request to the mobility management node (message 2).

According to some of the example embodiments, in the case that the mobility management node previously received a Context Response message, for example, during a TAU in idle mode, indicating a RAN congestion status with a RAN congestion, and if the current cell is not indicating a RAN congestion or the current RAN congestion is lower or different than the previously stored RAN congestion, the mobility management node may indicate the RAN congestion change to the PCRF (message 2A). Thereafter, authentication and security procedures may take place (message 3). Initial Context Setup procedures are also provided (messages 4-7).

The mobility management node is configured to send a Modify Bearer Request message to the SGW (message 8). According to some of the example embodiments, the Modify Bearer Request message may comprise an indication of the current RAN congestion status, for example if the RAN congestion is different, no longer exists or is lower. The SGW may thereafter forward the Modify Bearer Request message to the PGW (message 9). According to some of the example embodiments, the forwarded message (message 9) may also comprise the current RAN congestion status or any indication comprised therein. It should be appreciated that the current RAN congestion level may be forwarded if a congested state is changed from congested to non-congested for a particular user or wireless device. Thereafter, the wireless device (UE) triggered Service Request procedure may continue as known in the art (messages 10-12).

Dynamic RAN Congestion Status Updates

According to some of the example embodiments, the RAN congestion status may be provided dynamically while the wireless device is connected to the network for a period of time, for example, when the wireless device is in a connected state or non-idle mode. The time period may be a predetermined time period which is measured with respect to any number of thresholds. It should be appreciated that the example embodiments directed towards dynamic RAN congestion status updates also comprise mobility procedures in which the wireless device is in a connected mode for a predetermined period of time. It should further be appreciated that an update does not necessarily mean that the RAN congestion status of a particular wireless device has changed. The notification may be provided if, for example, a RAN node aggregates a newly detected congested wireless device. In this instance, the RAN node may send the notification for all wireless devices served by the RAN node in a common message.

Figure 6:
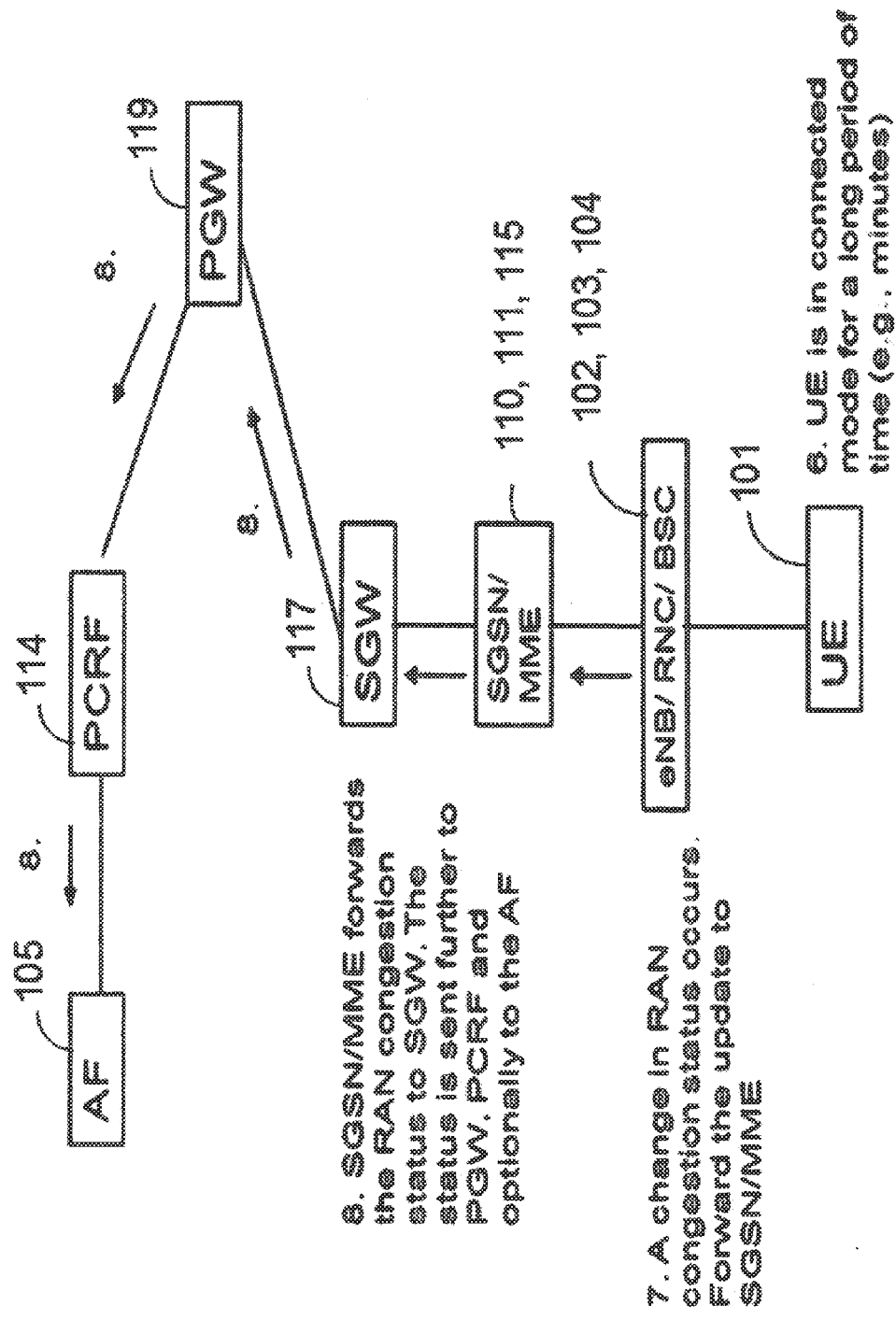
FIG. 6 is a message flow diagram depicting dynamic RAN congestion status management, according to some of the example embodiments.

FIG. 6 illustrates a message flow for a dynamic RAN congestion status update according to some of the example embodiments. If the wireless device (UE) has been connected for a long period of time, for example in a non-idle mode, the RAN node may provide a RAN congestion status. It should be appreciated that a long period of time may be, for example, on the order of minutes.

Once the RAN node 102, 103, 104 detects that a RAN congestion status has changed or there is a need to provide the RAN congestion status, the RAN node sends the updated RAN congestion status to the mobility management node, for example an MME 115, Gn/Gp SGSN 111 or an S4-SGSN 110 (message 7). It should be appreciated that the amount of change needed to initiate an update of the update of the RAN congestion status may be determined by comparing the amount of change to a predetermined threshold value. It should be appreciated that such a threshold value may be dynamic.

The mobility management node 110, 111, 115 in-turn will save the updated RAN congestion status with the mobility management node (message 8). The mobility management node will also forward the RAN congestion status to the SGW, the PGW, PCRF, the AF and/or to the RCAF or a similar function.

RAN Congestion Status Management During Detach Procedures

Figure 7:
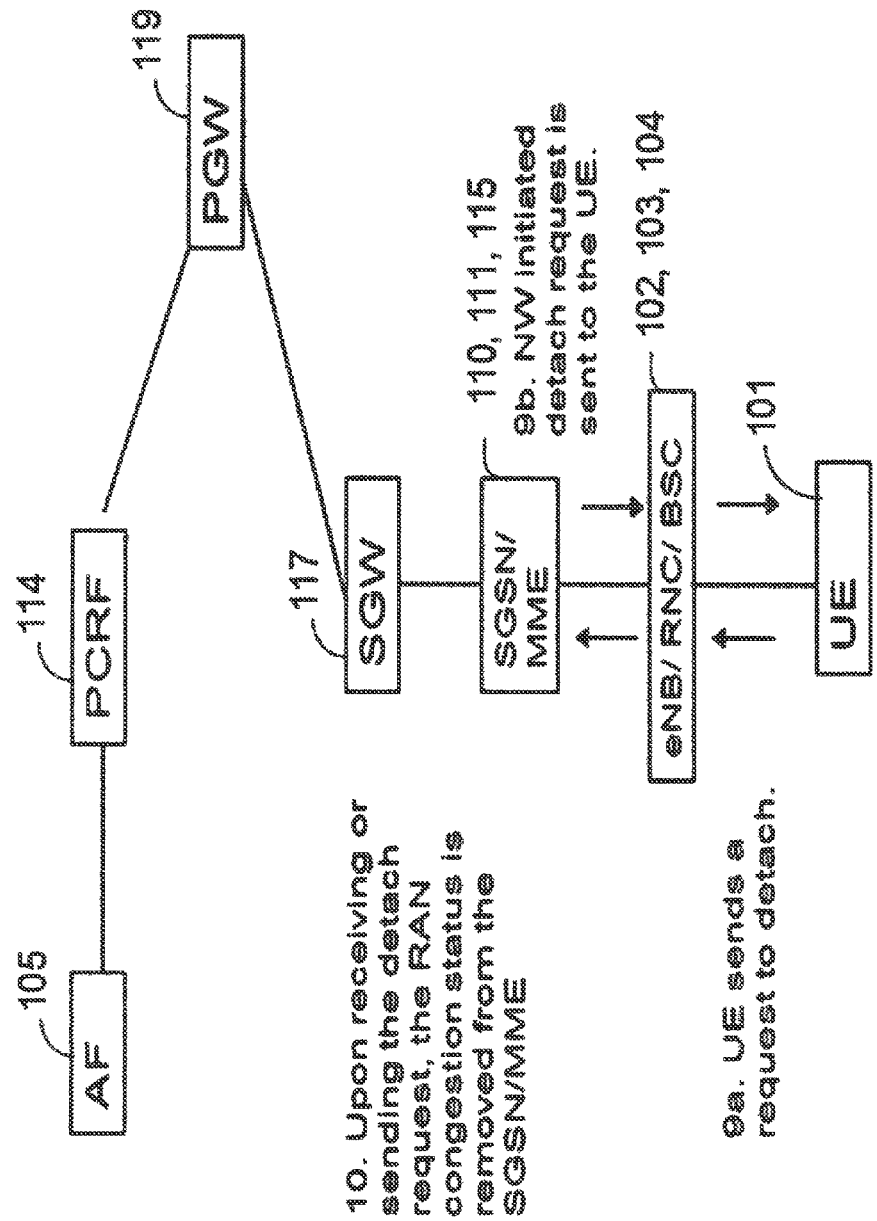
FIG. 7 is a message flow diagram depicting RAN congestion status management during a wireless device detach, according to some of the example embodiments.

According to some of the example embodiments, procedure may be set in place for the management of the RAN congestion status during wireless device detach procedures. FIG. 7 illustrates a flow diagram of RAN congestion status management during a detach procedure. A wireless device (UE) may initiate a detach request which is sent to the network and forwarded to the mobility management node, for example, a MME, Gn/Gp SGSN or a S4-SGSN (message 9a). A network initiated detach request may be sent to the wireless device (UE) or the procedure may be processed within the network (message 9b).

Upon receiving such a request or processing the procedure via either message 9a or message 9b, the mobility management node may delete the RAN congestion status it has currently saved for the wireless device initiating the detach request. In-turn other core network nodes, for example, SGW, PGW, PCRF and/or AF, may also delete the RAN congestion status associated with the detached wireless device.

Example Node Configurations

Figure 8:
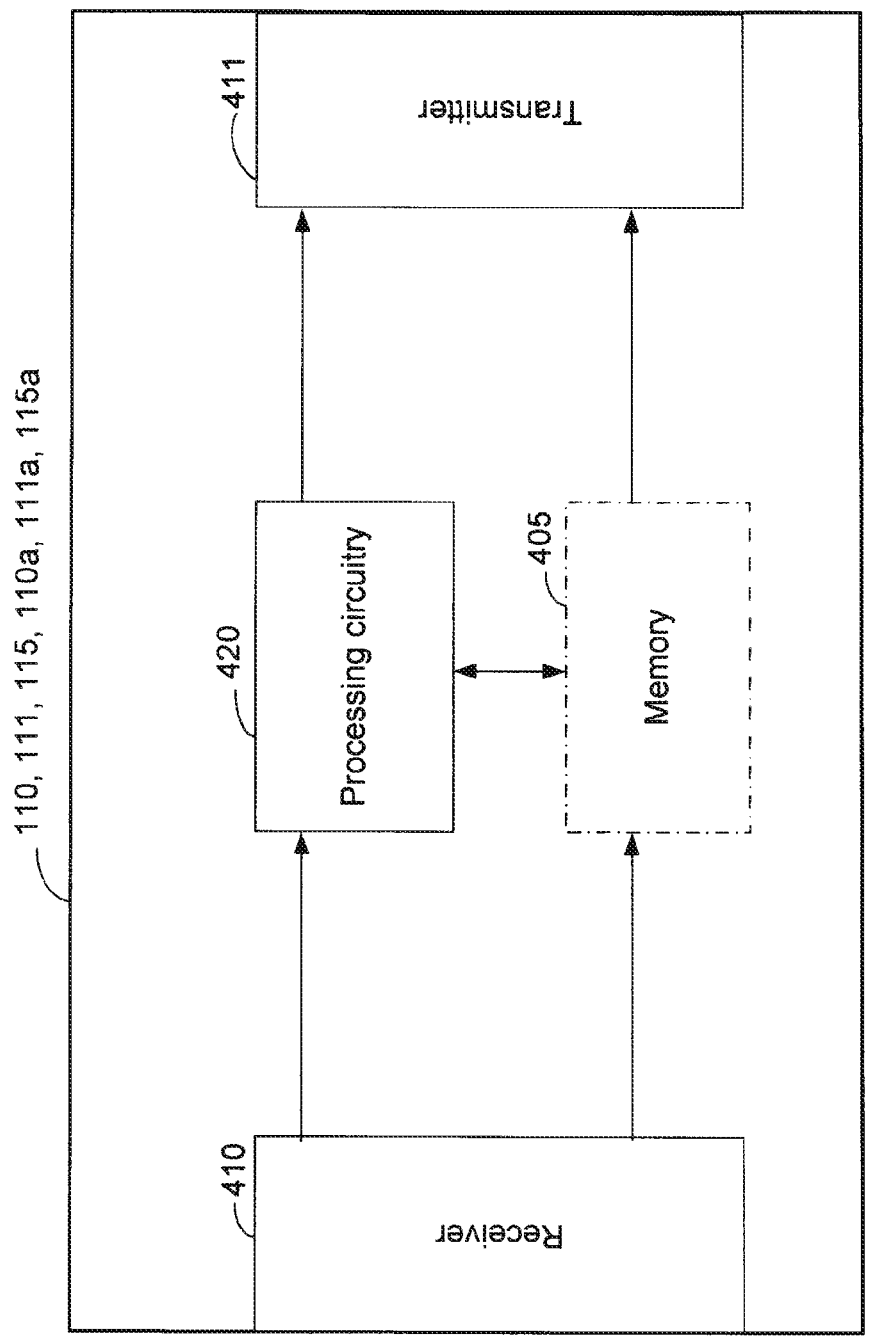
FIG. 8 is an illustration of an example node configuration of a mobility management node, according to some of the example embodiments.

FIG. 8 illustrates an example node configuration of a mobility management node. It should be appreciated that a mobility management node may be an MME 115, Gn/Gp SGSN 111, or an S4-SGSN 110. The mobility management node may perform some of the example embodiments described herein. The mobility management node may comprise radio circuitry, a communication port or a receiver 410 and transmitter 411 that may be configured to receive and/or transmit communication data, instructions, messages and/or any information related to a RAN congestion status. It should be appreciated that the radio circuitry, a communication port or a receiver 410 and transmitter 411 may be comprised as any number of transceiving, receiving, and/or transmitting units, modules or circuitry. It should further be appreciated that the radio circuitry, a communication port or a receiver 410 and transmitter 411 may be in the form of any input or output communications port known in the art. The radio circuitry, a communication port or a receiver 410 and transmitter 411 may comprise RF circuitry and baseband processing circuitry (not shown).

The mobility management node may also comprise a processing module, unit or circuitry 420 which may be configured to provide and retrieve priority information as described herein. The processing circuitry 420 may be any suitable type of computation unit, for example, a microprocessor, digital signal processor (DSP), field programmable gate array (FPGA), or application specific integrated circuit (ASIC), or any other form of circuitry. The mobility management node may further comprise a memory unit or circuitry 405 which may be any suitable type of computer readable memory and may be of volatile and/or non-volatile type. The memory 405 may be configured to store received, transmitted, and/or measured data, device parameters, communication priorities, any form of RAN congestion status information and/or executable program instructions.

Figure 9:
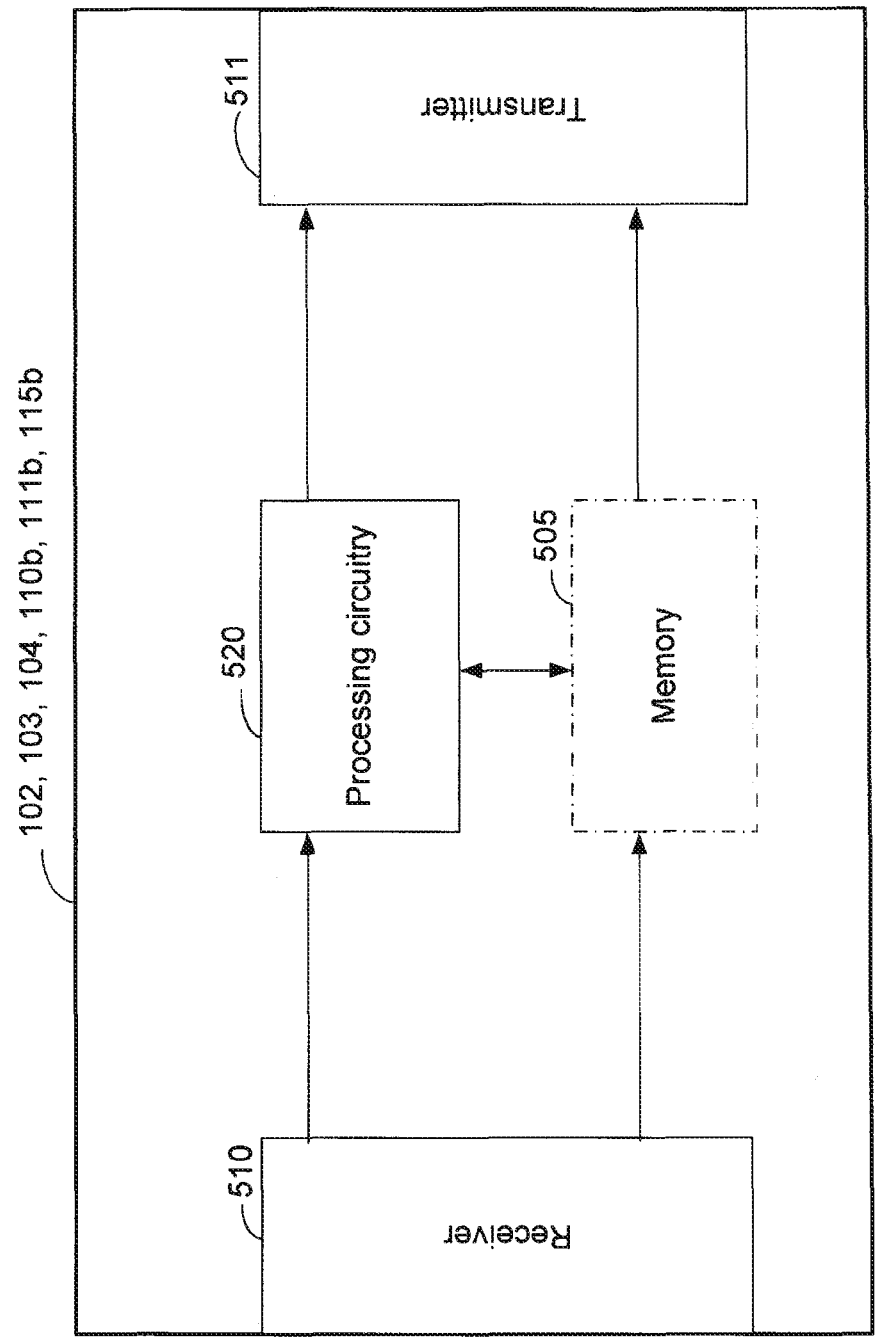
FIG. 9 is an illustration of an example node configuration of a communications node, according to some of the example embodiments.

FIG. 9 illustrates an example node configuration of a communications node. It should be appreciated that a communications node may be a RAN node 102, 103, 103, a source or old MME 115b, an old Gn/Gp SGSN 111b, or an old S4-SGSN 110b. The communications node may perform some of the example embodiments described herein. The communications node may comprise radio circuitry, a communication port or a receiver 510 and transmitter 511 that may be configured to receive and/or transmit communication data, instructions, messages and/or any information related to a RAN congestion status. It should be appreciated that the radio circuitry, a communication port or a receiver 510 and transmitter 511 may be comprised as any number of transceiving, receiving, and/or transmitting units, modules or circuitry. It should further be appreciated that the radio circuitry, a communication port or a receiver 510 and transmitter 511 may be in the form of any input or output communications port known in the art. The radio circuitry, a communication port or a receiver 510 and transmitter 511 may comprise RF circuitry and baseband processing circuitry (not shown).

The communications node may also comprise a processing module, unit or circuitry 520 which may be configured to provide and retrieve priority information as described herein. The processing circuitry 420 may be any suitable type of computation unit, for example, a microprocessor, digital signal processor (DSP), field programmable gate array (FPGA), or application specific integrated circuit (ASIC), or any other form of circuitry. The communications node may further comprise a memory unit or circuitry 505 which may be any suitable type of computer readable memory and may be of volatile and/or non-volatile type. The memory 505 may be configured to store received, transmitted, and/or measured data, device parameters, communication priorities, any form of RAN congestion status information and/or executable program instructions.

Example Node Operations

Figure 10:
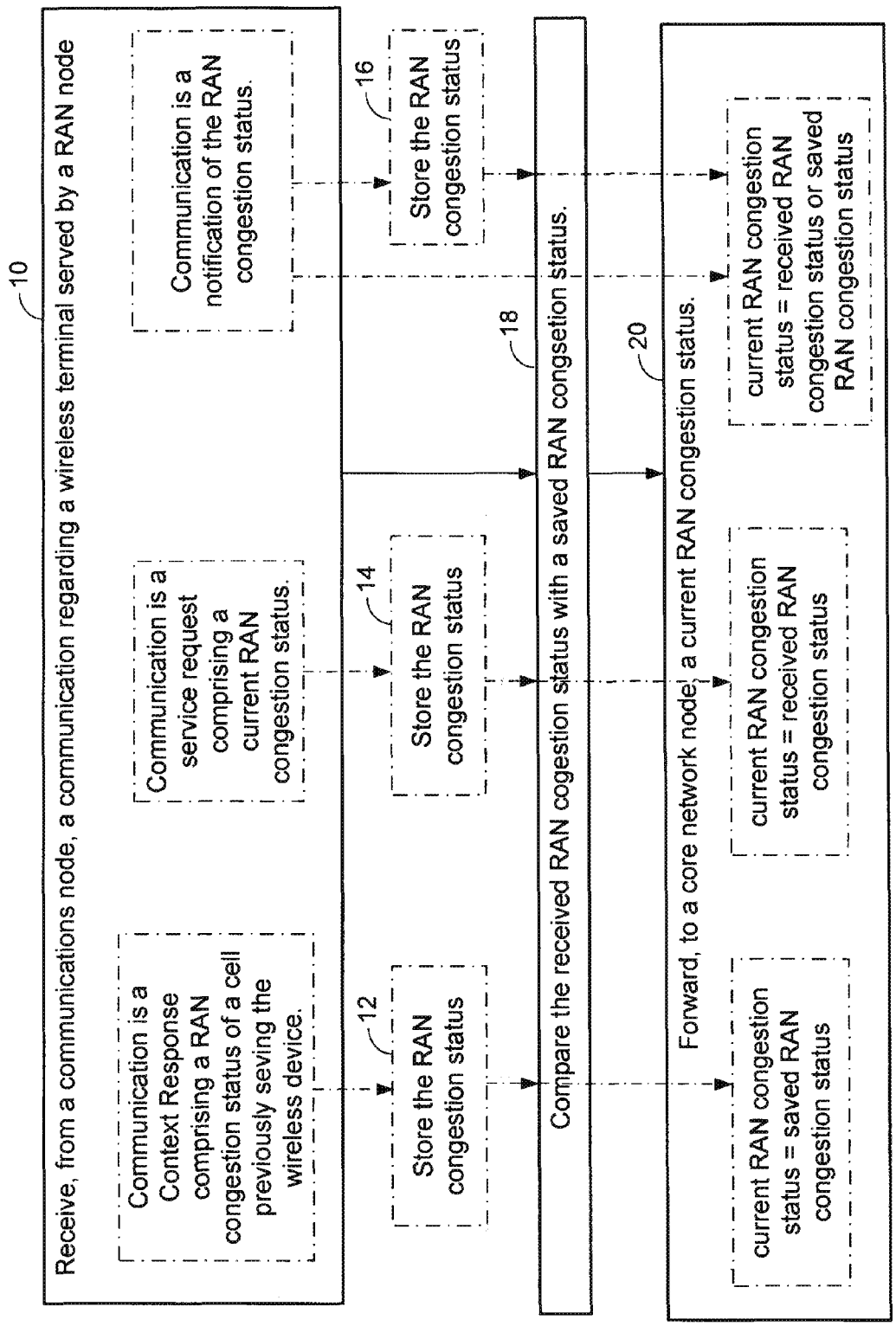
FIG. 10 is a flow diagram depicting example operations which may be taken by the mobility management node of FIG. 8, according to some of the example embodiments.

FIG. 10 is a flow diagram depicting example operations which may be taken by the mobility management node as described herein for managing a RAN congestion status. It should be appreciated that the mobility management node may be a S4-SGSN 110, a Gn/Gp SGSN 111, a MME 115, a new or target S4-SGSN 110a, a new or target Gn/Gp SGSN 111a, or a new or target MME 115a. It should also be appreciated that FIG. 10 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 10

The mobility management node 110, 111, 115, 110a, 111a, 115a is configured to receive 10, from a communications node 102, 103, 104, 110b, 111b, 115b, a communication regarding a wireless device 101 served by a RAN node 102, 103, 104. The communication comprises a received RAN congestion status. The receiver 410 is configured to receive, from the communications node, the communication regarding the wireless device served by the RAN node.

According to some of the example embodiments, the communication may be a Context Response received during a RAU or TAU procedure made by the wireless terminal. In this example embodiment, the received RAN congestion status is associated with a cell which was previously serving the wireless device. This example embodiment is further described under at least the subheading 'RAN congestion status transfer during a mobility procedure'.

According to some of the example embodiments, the communication may be a Service Request initiated by either the wireless device or the network. In this example embodiment, the received RAN congestion status is associated with a cell previously serving the wireless device. This example embodiment is further described under at least the subheading 'RAN congestion status transfer during a Service Request'.

According to some of the example embodiments, the communication may be a notification of a RAN congestion status. In this example embodiment, the communication may comprise a RAN congestion status associated with a cell currently serving the wireless device. This example embodiment is further described under at least the subheading 'Dynamic RAN congestion status updates'.

According to some of the example embodiments, the communication or notification may be received during a mobility procedure of the wireless device, for example a handover, TAU or RAU, and the wireless device is in a connected state. According to these example embodiments, the received RAN congestion status is associated with a cell previously serving the wireless device.

According to some of the example embodiments, the communication may be a notification that the wireless device is to detach from the network. This example embodiment is further described under at least the subheading 'RAN congestion status management during detach procedures'.

Example Operation 12

According to some of the example embodiments, the communication may be a Context Response received during a RAU or TAU procedure made by the wireless terminal. In such an embodiment, the communication further comprises a RAN congestion status of a cell which was previously serving the wireless device. In this example embodiment, the communication node is an old mobility management node 110b, 111b, 115b. Furthermore, in this example embodiment, the mobility management node is a new Gn/Gp SGSN 111a, a new MME 115a or a new S4-SGSN 110a.

In this example embodiment, the new mobility management node 110a, 111a, 115a may be further configured to store 12 the received RAN congestion status within the new mobility management node. The processing circuitry 420 may be configured to store the received RAN congestion status within the new mobility management node. According to some of the example embodiments, the storing 12 may occur while the wireless device is in idle mode or has just exited an idle mode. Thus, further analysis of the received RAN congestion status need not take place immediately after receiving 10 the communication. This example embodiment is further described under at least the subheading 'RAN congestion status transfer during a mobility procedure' and FIGS. 2 and 3.

Example Operation 14

According to some of the example embodiments, the communication may be a Service Request initiated by either the wireless device or the network. In this example embodiment, the received RAN congestion status is a current RAN congestion status associated with a cell currently serving the wireless device. In this example embodiment, the communications node is a RAN node 102, 103, 104. Furthermore, in this example embodiment, the mobility management node is a current or new Gn/Gp SGSN 111, 111a, MME 115, 115a, or a S4-SGSN 110, 110a.

In this example embodiment, the mobility management node may be further configured to store 14 the received RAN congestion status within the mobility management node. The processing circuitry 420 is configured to store the received RAN congestion status within the mobility management node. This example embodiment is further described under at least the subheading 'RAN congestion status transfer during a Service Request' and FIGS. 4 and 5.

Example Operation 16

According to some of the example embodiments, the communication may be a notification of the RAN congestion status, provided while the wireless device is in a connected state, for example, when the wireless device is not in an idle mode.

According to this example embodiment, the received RAN congestion status is the current RAN congestion status. In this example embodiment the communications node is a RAN node 102, 103, 104. Furthermore, according to this example embodiment, the mobility management node is a Gn/Gp SGSN 111, 111*a* or a S4-SGSN 110, 110*a*.

According to this example embodiment, the notification may indicate the RAN congestion status associated with the wireless device has changed. Alternatively, the notification may provide an unchanged RAN congestion status, for example, if the RAN node aggregates newly detected congested wireless devices. In such an instance, the RAN node may send a congestion state for all wireless devices in a common message. It should further be appreciated that the notification may be any communication informing the mobility management node, at any point in time, of a valid RAN congestion status.

In this example embodiment, the mobility management node is further configured to store 16 the received RAN congestion status. The processing circuitry 420 is further configured to store the received RAN congestion status. This example embodiment is further described under at least the subheading 'Dynamic RAN congestion status updates' and FIG. 6.

According to some of the example embodiments, the communication or notification may be received during a mobility procedure of the wireless device, for example a handover, TAU or RAU, while the wireless device is in a connected state. According to these example embodiments, the received RAN congestion status need not be saved as the received RAN congestion status in this embodiment is associated with a congestion level of a cell previously serving the wireless device. This example embodiment is further described under at least the subheading 'RAN congestion status transfer during a mobility procedure'.

Operation 18

The mobility management node 110, 111, 115, 110*a*, 111*a*, 115*a* is further configured to compare 18 the received RAN congestion status with a saved RAN congestion status. The saved RAN congestion status is saved within the mobility management node prior to the receiving 10. The processing circuitry 420 is configured to compare the received RAN congestion status with the saved RAN congestion status.

By comparing the received and the saved RAN congestion status, a determination may be made as to how to handle the received RAN congestion status. It should be appreciated that the comparison is performed within the mobility management node.

According to some of the example embodiments, the received RAN congestion status indicates a non-congestion state and the saved RAN congestion status indicates a congestion state, or the received RAN congestion status indicates a congestion state and the saved RAN congestion status indicates a non-congestion state or a congestion state.

Operation 20

If a congestion level of the received RAN congestion status is different than a congestion level of the saved RAN congestion status, the mobility management node 110, 111, 115, 110*a*, 111*a*, 115*a* is further configured to forward 20, to a core network node 105, 113, 114, 117, 119 or a RACF 116, a current RAN congestion status associated with the wireless device in a cell currently serving the wireless device. The current RAN congestion status is either the received RAN congestion status or the saved RAN congestion status. The processing circuitry 420 is configured to forward, to the core network node or the RACF, the current RAN congestion status if the congestion level of the received RAN congestion status is different than a congestion level of the saved RAN congestion status.

FIG. 11 is a flow diagram depicting example operations which may be taken by the communications node as described herein for managing a RAN congestion status. It should be appreciated that the communications node may be a RAN node 102, 103, 103, a source or old MME 115*b*, an old Gn/Gp SGSN 111*b*, or an old S4-SGSN 110*b*. It should also be appreciated that FIG. 11 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 22

The communications node 102, 103, 104, 110*b*, 111*b*, 115*b* is configured to send 32, to a mobility management node 110, 111, 115, 110*a*, 111*a*, 115*a*, a communication regarding a wireless device 101 served by a RAN node 102, 103, 104. The communication is utilized for RAN congestion status management within the mobility management node during a wireless device mobility procedure and/or when the wireless device is in a connected state for a time period. The transmitter 511 is configured to send, to the mobility management node, the communication regarding the wireless device served by the RAN node. If the communications node is a RAN node 102, 103, 104, the mobility management node is a Gn/Gp SGSN 111, 111 or a S4-SGSN 110, 110*a*. It should be appreciated that the wireless device being in a connected state for a time period shall be interpreted as the wireless device not being in an idle mode. According to some of the example embodiments, the time period may be a predetermined time period which may be measured against any number of threshold values.

According to some of the example embodiments, the communication may be a Context Response received during a RAU or TAU procedure made by the wireless device. In this example embodiment, the communication may comprise a RAN congestion status of a cell which was previously serving the wireless device. According to this example embodiment the communications node is an old Gn/Gp SGSN 111*b*, an old MME, or an old S4-SGSN. Furthermore, according to this example embodiment, the mobility management node is a new MME 115*a*, a new Gn/Gp SGSN 111*a* or a new S4-SGSN 110*a*. This example embodiment is further described under at least the subheading 'RAN congestion status transfer during a mobility procedure'.

According to some of the example embodiments, the communication may be a Service Request initiated by either the wireless device or the network. In this example embodiment, the communication may comprise a current RAN congestion status previously stored in the mobility management node. According to this example embodiment, the communications node is a RAN node 102, 103, 104. Furthermore, according to this example embodiment, the mobility management node is a Gn/Gp SGSN 111, 111*a* or a S4-SGSN 110, 110*a*. This example embodiment is further described under at least the subheading 'RAN congestion status transfer during a Service Request'.

According to some of the example embodiments, the communication may be a Service Request initiated by either the wireless device or the network. In this example embodiment, the communication may comprise a current RAN congestion status previously stored in the mobility management node. According to this example embodiment, the communications node is a RAN node 102, 103, 104. Furthermore, according to this example embodiment, the mobility management node is a Gn/Gp SGSN 111, 111a, or a S4-SGSN 110, 110a. This example embodiment is further described under at least the subheading 'RAN congestion status transfer during a Service Request'.

According to some of the example embodiments, the communication may be a notification that a change in RAN congestion status has occurred while the wireless device has been in the connected state for the period of time. In this example embodiment, the communication may comprise a RAN congestion status associated with a cell currently serving the wireless device. According to this example embodiment, the communications node is a RAN node 102, 103, 104. Furthermore, according to this example embodiment, the mobility management node is a Gn/Gp SGSN 110, 110a or a S4-SGSN 111, 111a. This example embodiment is further described under at least the subheading 'Dynamic RAN congestion status updates'.

According to some of the example embodiments, the communication may be a notification that the wireless device is to detach from the network. According to this example embodiment, the communications node is a RAN node 102, 103, 104. Furthermore, according to this example embodiment, the mobility management node is a Gn/Gp SGSN 110, 110a, or a S4-SGSN 111, 111a. This example embodiment is further described under at least the subheading 'RAN congestion status management during detach procedures'.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following non-limiting summary of example embodiments.

The invention claimed is:

1. A method, in a target mobility management node (MMN), for Radio Access Node (RAN) congestion status handling, the method comprising:
   the target MMN receiving a first message associated with a wireless device;
   the target MMN, as a result of receiving the first message, transmitting a request to a source MMN that had previously served the wireless device, wherein the source MMN is configured to respond to the request by transmitting a response comprising first RAN congestion status information indicating a first congestion level of a RAN that was servicing the wireless device prior to the target MMN receiving the first message;
   the target MMN receiving the response comprising the first RAN congestion status information;
   the target MMN storing the first RAN congestion status information;

after storing the first RAN congestion status information, the target MMN receiving a second message comprising second RAN congestion status information indicating a second congestion level of a RAN currently servicing the wireless device, wherein said RAN currently servicing the wireless device is different than said RAN that was servicing the wireless device prior to the target MMN receiving the first message;

comparing the second RAN congestion status information with the first RAN congestion status information to determine whether the second congestion level is different than the first congestion level; and in response to determining that the second congestion level is different than the first congestion level, the target MMN forwarding, to a core network node or a RAN Congestion Awareness Function (RCAF), the second RAN congestion status information.

2. The method of claim 1, wherein the target MMN is one of a Gn/Gp Serving General Packet Radio Service Support Node, Gn/Gp SGSN, a Mobility Management Entity, MME or a S4-SGSN, the source MMN is a Gn/Gp SGSN, an MME or an S4-SGSN, the request is a Context Request transmitted by the target MMN as part of a Routing Area Update or a Tracking Area Update procedure initiated by the wireless device.

3. The method of claim 1, wherein the second message was transmitted by the RAN currently servicing the wireless device, the target MMN is a Gn/Gp Serving General Packet Radio Service Support Node, Gn/Gp SGSN or an S4-SGSN or a Mobility Management Entity, MME, the second message is a Service Request.

4. The method of claim 1, wherein the second message was transmitted by the RAN currently servicing the wireless device, the target MMN is a Gn/Gp Serving General Packet Radio Service Support Node, Gn/Gp SGSN, or a S4-SGSN or a Mobility Management Entity, MME, the second message is a notification of the RAN congestion status while the wireless device is in a connected state, and the method further comprises: storing the second RAN congestion status information within the target MMN.

5. The method of claim 1, wherein the first message is one of: a Routing Area Update (RAU) request and a Tracking Area Update (TAU) request.

6. The method of claim 1, wherein the second RAN congestion status information indicates a non-congestion state and the first RAN congestion status information indicates a congestion state.

7. A target mobility management node (MMN) for Radio Access Node (RAN) congestion handling, the target MMN comprising:

a receiver;
a transmitter; and
processing circuitry, wherein the target MMN is configured to:

as a result of receiving a first message associated with a wireless device, employ the transmitter to transmit a request to a source MMN that had previously served the wireless device, wherein the source MMN is configured to respond to the request by transmitting a response comprising first RAN congestion status information indicating a first congestion level of a RAN that was servicing the wireless device prior to the target MMN receiving the first message;

store the first RAN congestion status information after receiving the response comprising the first RAN congestion status information;

process a second message comprising second RAN congestion status information indicating a second congestion level of a RAN currently servicing the wireless device wherein said RAN currently servicing the wireless device is different than said RAN that was servicing the wireless device prior to the target MMN receiving the first message;

compare the first RAN congestion status information with second RAN congestion status information to determine whether the second congestion level is different than the first congestion level; and forward, to a core network node or a RAN Congestion Awareness Function (RCAF), the second RAN congestion status information in response to determining that the second congestion level is different than the first congestion level.

8. The target MMN of claim 7, wherein the target MMN is one of: a Gn/Gp Serving General Packet Radio Service Support Node (Gn/Gp SGSN), a Mobility Management Entity (MME), and a S4-SGSN, the source MMN is one of a Gn/Gp SGSN, an MME, and an S4-SGSN, the request is a Context Request transmitted by the target MMN as part of a Routing Area Update or a Tracking Area Update procedure initiated by the wireless device.

9. The target MMN of claim 7, wherein the second message was transmitted by a communication node within the said RAN currently servicing the wireless device, the target MMN is one of a Gn/Gp Serving General Packet Radio Service Support Node (Gn/Gp SGSN), an S4-SGSN, and a Mobility Management Entity (MME), and the second message is a Service Request.

10. The target MMN of claim 7, wherein the second message was transmitted by a communication node within the said RAN currently servicing the wireless device, the target MMN is one of a Gn/Gp Serving General Packet Radio Service Support Node (Gn/Gp SGSN), a S4-SGSN, and a Mobility Management Entity (MME), and the second message is a notification of the RAN congestion status while the wireless device is in a connected state.

11. The target MMN of claim 7, wherein the first message is one of: a Routing Area Update (RAU) request and a Tracking Area Update (TAU) request.

12. The target MMN of claim 7, wherein the second RAN congestion status information indicates a non-congestion state and the first RAN congestion status information indicates a congestion state.

13. A method, in a source mobility management node (MMN), for congestion status handling, the method comprising:

receiving, at the source MMN, a first message comprising congestion status information indicating a congestion level of a radio access node (RAN) that is servicing a wireless device at the time the first message is received;

storing, in the source MMN, the congestion status information;

after storing the congestion status information, receiving, at the source MMN, a Context Request addressed to the source MMN, wherein the Context Request was transmitted by a target MMN as a result of the target MMN receiving a location update message regarding the wireless device; and in response to the Context Request, transmitting, by the source MMN, to the second MMN a Context Response, said Context Response comprising the congestion status information and information about the wireless device.

14. The method of claim 13, wherein the source MMN is one of a Gn/Gp Serving General Packet Radio Service Support Node (Gn/Gp SGSN), a S4-SGSN, and a Mobility Management Entity (MME), the target MMN is one of a Gn/Gp Serving General Packet Radio Service Support Node (Gn/Gp SGSN), a S4-SGSN, and a Mobility Management Entity (MME).

15. The method of claim 13, wherein the first message was transmitted by the RAN.

16. The method of claim 13, wherein the location update message is one of a Routing Area Update (RAU) message and a Tracking Area Update (TAU) message.

17. A source mobility management node (MMN) for congestion handling, the first MMN comprising:

a receiver;

a transmitter; and processing circuitry, wherein the source MMN is configured to:

employ the receiver to receive a first message comprising congestion status information indicating a congestion level of a radio access node (RAN) that is servicing a wireless device at the time the message is received;

storing the congestion status information;

after storing the congestion status information, receiving a Context Request addressed to the source MMN, wherein the Context Request was transmitted by a target MMN as a result of the target MMN receiving a location update message regarding the wireless device; and in response to the Context Request, transmitting to the target MMN a Context Response, said Context Response comprising the congestion status information and information about the wireless device.

18. The first MMN of claim 17, wherein the source MMN is one of a Gn/Gp Serving General Packet Radio Service Support Node (Gn/Gp SGSN), a S4-SGSN, and a Mobility Management Entity (MME), the target MMN is one of a Gn/Gp Serving General Packet Radio Service Support Node (Gn/Gp SGSN), a S4-SGSN, and a Mobility Management Entity (MME).

19. The first MMN of claim 17, wherein the first message was transmitted by the RAN.

20. The first MMN of claim 17, wherein the location update message is one of a Routing Area Update (RAU) message and a Tracking Area Update (TAU) message.

* * * * *

UNITED STATES PATENT AND TRADEMARK OFFICE
CERTIFICATE OF CORRECTION

| | |
|---|---|
| PATENT NO. | : 9,532,327 B2 |
| APPLICATION NO. | : 14/301785 |
| DATED | : December 27, 2016 |
| INVENTOR(S) | : Karlsson et al. |

It is certified that error appears in the above-identified patent and that said Letters Patent is hereby corrected as shown below:

On the Title Page

In Item (56), under "U.S. PATENT DOCUMENTS", in Column 2, Line 1, delete "Aoyama" and insert -- Aoyama et al. --, therefor.

In Item (56), under "U.S. PATENT DOCUMENTS", in Column 2, Line 4, delete "Yang" and insert -- Yang et al. --, therefor.

In Item (56), under "U.S. PATENT DOCUMENTS", in Column 2, Line 8, delete "Kelley" and insert -- Kelley et al. --, therefor.

In the Specification

In Column 3, Line 46, delete "GSM/EDGE" and insert -- GSM EDGE --, therefor.

In Column 4, Line 37, delete "Identifier" and insert -- Identifier Number --, therefor.

In Column 4, Line 40, delete "UICCI Universal Integrated Circuit Car" and insert -- UICC Universal Integrated Circuit Card --, therefor.

In Column 4, Line 61, delete "embodiments," and insert -- embodiments; --, therefor.

In Column 4, Line 67, delete "embodiments," and insert -- embodiments; --, therefor.

In Column 10, Line 28, delete "GGSN," and insert -- GGSN 113, --, therefor.

In Column 12, Line 45, delete "103, 103," and insert -- 103, 104, --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,532,327 B2

In Column 15, Line 56, delete "RACF" and insert -- RCAF --, therefor.

In Column 15, Line 62, delete "RACF," and insert -- RCAF, --, therefor.

In Column 16, Line 3, delete "103," and insert -- 104, --, therefor.

In Column 16, Line 32, delete "111, 111" and insert -- 111, 111a --, therefor.

In the Claims

In Column 20, Line 7, in Claim 7, delete "device" and insert -- device, --, therefor.

In Column 21, Line 5, in Claim 13, delete "second MMN" and insert -- target MMN --, therefor.

In Column 21, Line 21, in Claim 17, delete "first MMN" and insert -- source MMN --, therefor.

In Column 22, Line 15, in Claim 18, delete "first MMN" and insert -- source MMN --, therefor.

In Column 22, Line 22, in Claim 19, delete "first MMN" and insert -- source MMN --, therefor.

In Column 22, Line 24, in Claim 19, delete "first MMN" and insert -- source MMN --, therefor.